April 6, 1965     W. B. COCKS     3,176,402
THICKNESS CHECKING FIXTURE
Filed June 18, 1962     2 Sheets-Sheet 1
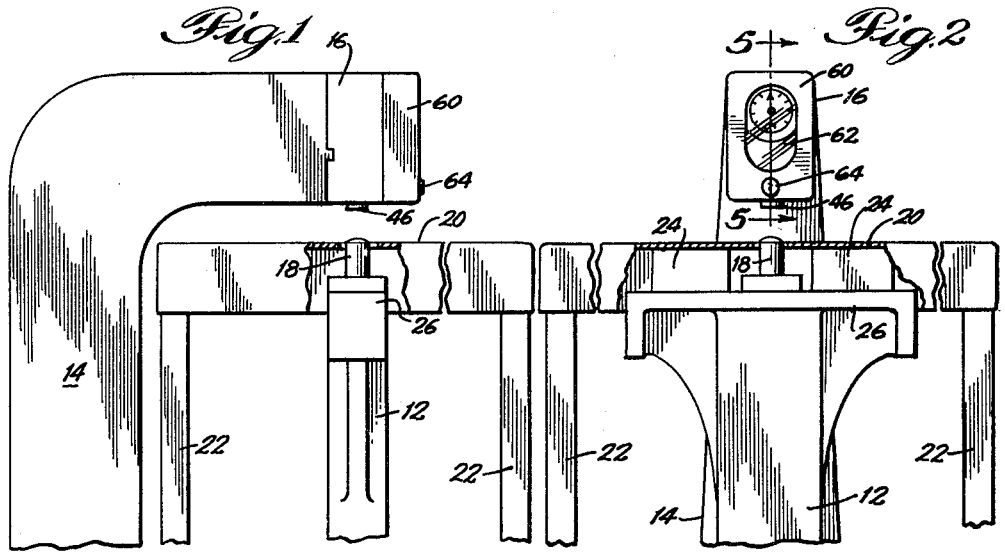
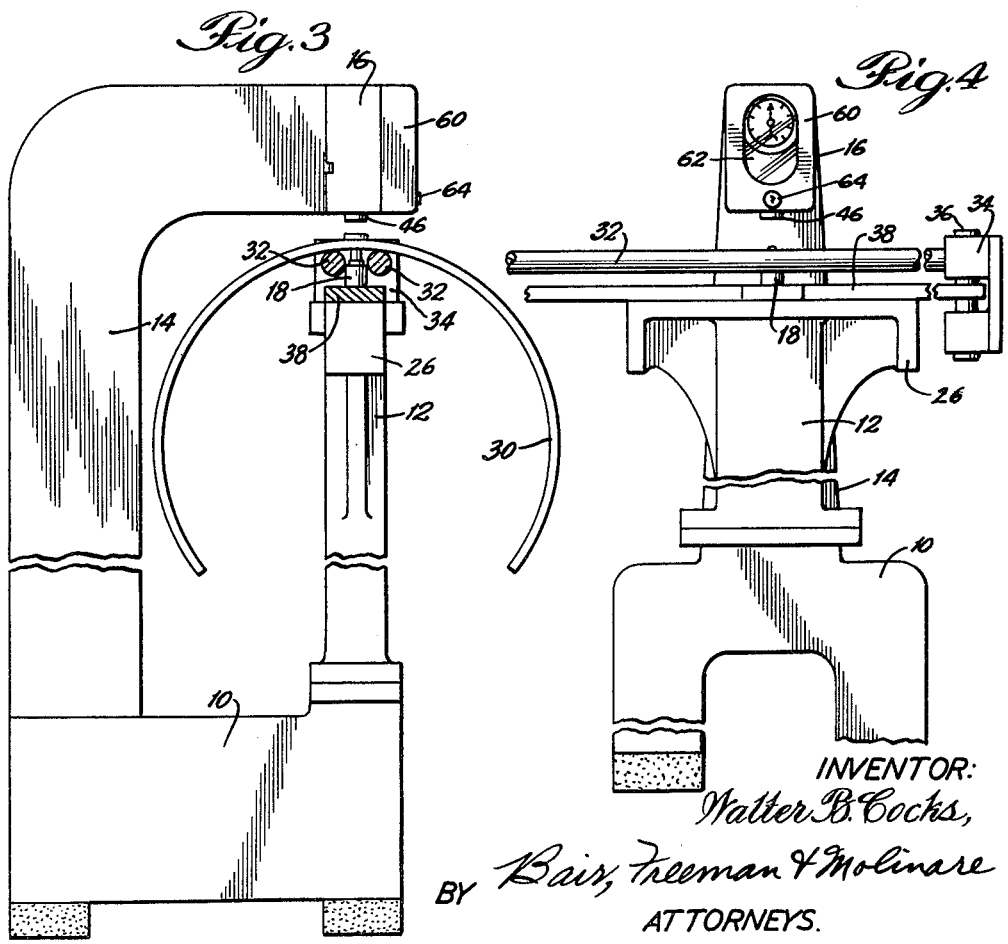
INVENTOR:
Walter B. Cocks,
BY Bair, Freeman & Molinare
ATTORNEYS.

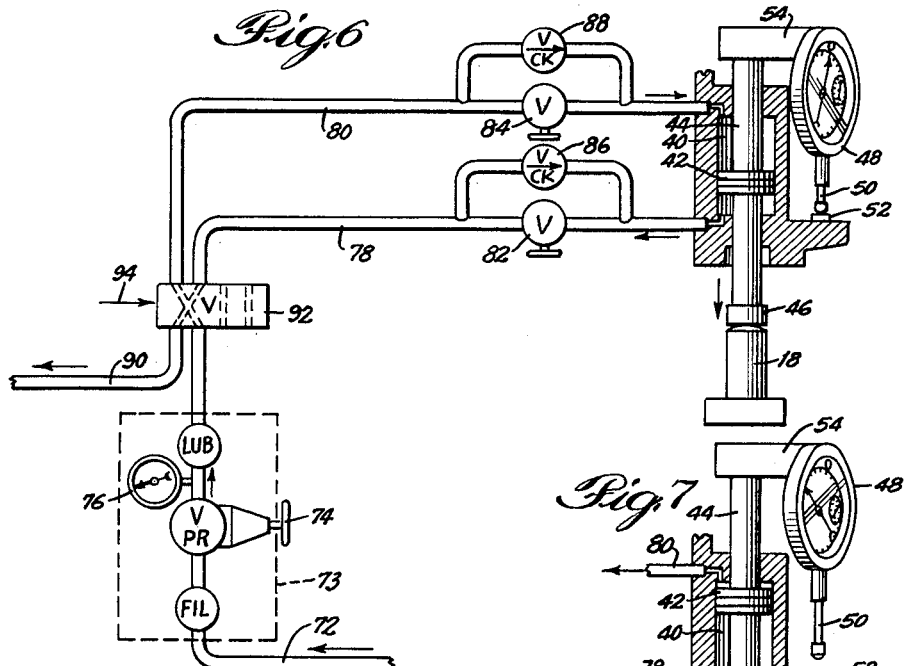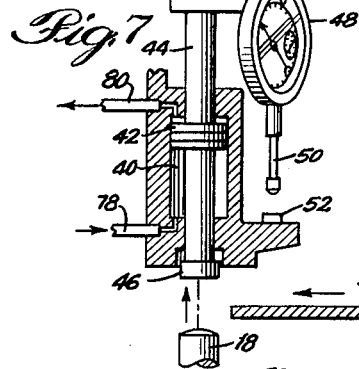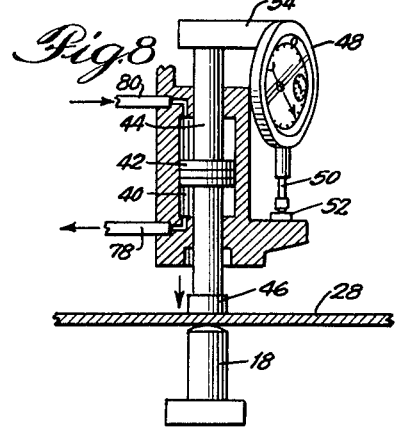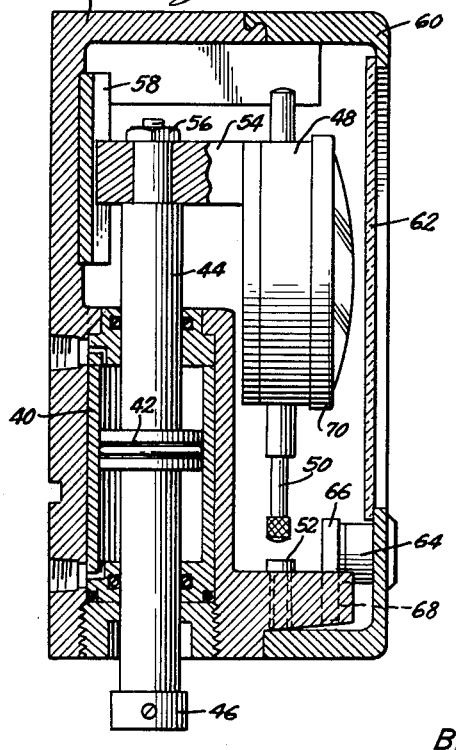
INVENTOR:
Walter B. Cocks,
BY Bair, Freeman & Molinare
ATTORNEYS.

United States Patent Office 3,176,402
Patented Apr. 6, 1965

3,176,402
THICKNESS CHECKING FIXTURE
Walter B. Cocks, Des Moines, Iowa, assignor to Meredith Publishing Company, Des Moines, Iowa, a corporation of Iowa
Filed June 18, 1962, Ser. No. 203,179
6 Claims. (Cl. 33—147)

This invention relates to a thickness checking fixture that involves the use of a dial gauge and in which fluid pressure provides a uniform pressure of a feeler element on work supported on an anvil of the fixture so that the same thickness reading is given regardless of who takes it thus eliminating variations caused by either manual or spring pressure such as used in other types of gauges, a particularly important consideration where the material being gauged is of resilient character.

One object of the invention is to provide a readily controllable and always uniform gauging pressure in a fixture of the thickness checking type.

Another object is to provide a pneumatic device which applies uniform resilient pressure so that two readings made on the same spot at two different times will be precisely the same and will not depend upon the operator and how much pressure he might apply.

Still another object is to provide a thickness checking fixture which is capable of accurate reading to plus or minus .0001" and which uses fluid pressure and can be accurately adjusted and controlled so as to always have the same given pressure on any thickness of material since the fluid pressure is utilized to exert the same pressure automatically regardless of the thickness of the material. Particularly in measuring resilient materials, my fixture makes it possible to measure comparative thicknesses since some compression takes place whereas to measure exact thickness a gauge using zero pressure would be required. Some pressure, however, is necessary and by the use of a pressure regulating valve for the fluid pressure used I can adjust for a minimum satisfactory for good gauge performance whereas heavier pressures may be normally desired depending on type of material such as metal as distinguished from packing used in the printing industry. The recent trend in the printing industry is to closer tolerances both for metal printing plates and the resilient packing that is used on printing cylinders and therefore there is a need for an accurate thickness checking fixture such as I disclose herein.

A further object is to provide a thickness checking fixture in which fluid control means is also used to actuate the feeler of the fixture to spread it with respect to the anvil to permit the insertion of the work and to thereafter bring the feeler into contact with the work, flow-control valve arrangements being provided to insure against violent contact of the feeler with the work thus eliminating the possibility of damage to the fixture as when manually contacting the fixture parts with the work.

With these and other objects in view, my invention consists in the construction, arrangement and combination of the various parts of my thickness checking fixture, whereby the objects above contemplated are attained, as hereinafter more fully set forth, pointed out in my claims and illustrated in detail on the accompanying drawings, wherein:

FIG. 1 is a side elevation of the upper end of my thickness checking fixture showing a table associated therewith for supporting flat work to be checked.

FIG. 2 is a front elevation of FIG. 1.

FIG. 3 is a side elevation partly in section of the fixture and a cylindrical packing support applied thereto for checking the thickness of packing as used in printing presses.

FIG. 4 is a front elevation of FIG. 3.

FIG. 5 is an enlarged vertical sectional view on the line 5—5 of FIG. 2 showing details within a head of the fixture.

FIG. 6 is a diagrammatic view of FIG. 5 and the fluid pressure system I utilize in conjunction with my thickness checking fixture and showing the parts in one position, and FIGS. 7 and 8 are views similar to a portion of FIG. 6 showing the parts in other positions during operation.

On the accompanying drawings I have used the reference numeral 10 to indicate a base of my thickness checking fixture. An anvil column 12 extends upwardly therefrom and terminates in an anvil 18. Spaced from the anvil column 12 is a gauge column 14 extending upwardly from the base 10 and toward the anvil 18. The gauge column terminates in a head 16 located above the anvil 18.

As shown in FIG. 1 a table 20 having supporting legs 22 may be associated with the anvil 18, blocking 24 being provided between a crosshead 26 of the anvil column 12 and the top of the table for locating such top in respect to the anvil so that the anvil projects only slightly thereabove. This table is suitable for supporting printing plates and other flat material to be thickness-checked such as shown at 28 in FIGS. 7 and 8.

My fixture is also adaptable for checking the thickness of curved material 30 as shown in FIG. 3 such as the packing used on the cylinders of printing presses. For this purpose it is desirable to substitute for the table 20 a pair of supporting rods 32 which at each end may be carried by brackets 34 vertically adjustable or slidable on pins 36 carried by a supporting bar 38 secured to the crosshead 26 as shown in FIG. 4.

As shown in FIG. 5 a cylinder 40 is located within the head 16 and has a piston 42 slidable therein. A piston rod 44 is connected with the piston 42 and extends from both ends of the cylinder 40. On its lower end it has a main feeler element 46, and a dial gauge 48 is mounted on its upper end, the gauge having a feeler pin 50 and the head 16 having an anvil 52 therefor. The gauge 48 is supported on a bracket 54 which in turn is supported on the shouldered upper end of the piston rod 44 by a nut 56. The bracket 54 is slidable in a vertical guideway 58 to keep the gauge 48 in proper alignment with the anvil 52.

A cover 60 is provided for the head 16 and has therein a closure glass 62 for the gauge 48. A lock 64 has a lock arm 66 normally engaging in a slot 68 of the head 16 to hold the cover 60 in position. The lock 64 may be unlocked for opening the cover 60 to gain access to the rim 70 of the dial gauge 48 for rotating it and thereby the scale of the dial in the usual manner for zeroing the gauge.

Referring to FIG. 6 a compressed air supply pipe is illustrated at 72 leading to a control panel 73. A filter "FIL," a pressure regulator valve "V-PR" and an air line lubricator "LUB" are associated with the control panel 73, the pressure regulator being adjustable by means of an adjusting handle 74 and the output pressure thereof being indicated on a pressure gauge 76.

Conduits 78 and 80 lead from the lower and upper ends of the cylinder 40 respectively to a control valve 92 which is also connected with the lubricator LUB and an exhaust conduit 90. Flow-control valves 82 and 84 are provided in the conduits 78 and 80, and check valves 86 and 88 shunt the flow-control valves and open toward the cylinder 40. This arrangement provides a fluid pressure control system for my thickness checking gauge operable in the following described manner.

Initially the gauge 48 may be "zeroed in" by setting the pressure regulator valve V-PR at the desired pressure as indicated on the gauge 76 for the main feeler element 46 with respect to the anvil 18. For this purpose the control valve 92 is pushed toward the right as indicated by the arrow 94 and assumes the position shown in FIG. 6 so that air flows into the top of the cylinder 40 and out of the lower end thereof. Whatever pressure is in the conduit on the output side of the pressure regulator valve is thus applied to the top of the piston 42 so that a predetermined pressure of the main feeler element 46 against the anvil 18 is had. At the same time the feeler pin 50 of the gauge 48 is in engagement with the anvil 52 and the dial of the gauge may now be rotated so that zero thereof matches the indicating needle of the gauge as shown in FIG. 6. This, of course, is done with the cover 60 removed and after once set the cover may be replaced for enclosing the gauge and associated parts against damage.

When the control valve 92 is shifted towards the left it will reverse the flow of fluid pressure in the cylinder 40 so as to raise the gauge 48 and the main feeler element 46 to provide space between the feeler element and the anvil 18 (FIG. 7) for entry of the material 28 to be gauged. After such entry the control valve 92 may again be positioned as in FIG. 6 for lowering the element 46 into contact with the material being gauged (FIG. 8), and the feeler pin 50 will engage the anvil 52 and rotate the needle of the dial gauge to a position that indicates the thickness of the material. The main feeler element 46 is thus always contacted with the material at the same pressure as long as the pressure regulating valve is kept at the pressure set. A desired pressure is decided upon and the pressure regulator valve set therefore whereupon the same pressure will always be exerted during the thickness checking operation.

By the use of the flow-control valves 82 and 84 and the check valves 86 and 88 the fluid pressure may flow rapidly to the cylinder but be checked against rapid movement when flowing away from the cylinder whereby the flow control valve 82 may be adjusted to control the downward motion of the piston and the flow control valve 84 may be adjusted for controlling the upward motion thereof. In general the downward motion should be relatively slower to prevent violent contact of the feeler element 46 with the material being checked and possible damage to the fixture whereas the upward motion can be faster for shortening the operating time.

My thickness checking fixture as herein disclosed makes possible accurate checking of thickness with assured uniform pressure during the checking operation and every time the device is operated. This is particularly important in connection with resilient packing such as shown at 30 in FIG. 3 so as to give some pressure but very light pressure (for instance 5 p.s.i. on the gauge 48) to the feeler operation whereas ordinary manual thickness checking operations depend upon the "feel" of the operator which may vary greatly from one checking operation to another. Thus, mechanical accuracy is assured and variations due to the feel by the operator at different times or to the feel by different operators is entirely eliminated.

Some changes may be made in the construction and arrangement of the parts of my thickness checking fixture without departing from the real spirit and purpose of my invention, and it is my intention to cover by my claims any modified forms of structure or use of mechanical equivalents which may reasonably be included within their scope.

I claim as my invention:

1. A thickness checking fixture of the character disclosed comprising a base, an anvil column extending upwardly therefrom, a main anvil carried by the upper end of said anvil column, a gauge column spaced horizontally from said anvil column and extending upwardly from said base, said gauge column having a head overhanging said main anvil, a cylinder in said head, a piston therein, supporting means carried by said piston, a dial gauge carried by said supporting means, a zero adjust anvil carried by said head in position to be engaged by the feeler pin of said dial gauge, said supporting means having a main feeler element projecting downwardly from said head in alignment with said main anvil, and means for selectively supplying actuating fluid under predetermined pressure to said cylinder to move said piston and thereby said main feeler element into contact with work on said main anvil.

2. In a thickness checking fixture, a main anvil, a gauge supporting head overhanging said main anvil in fixed relation thereto, a cylinder in said head, a piston therein, supporting means carried by said piston, a dial gauge carried by said supporting means, a zero adjust anvil carried by said head in position to be engaged by the feeler pin of said dial gauge, said supporting means having a main feeler element projecting downwardly from said head in alignment with said main anvil, and means for supplying fluid under selective pressure to one end of said cylinder to move said piston and thereby said main feeler element into contact with work on said main anvil or to the other end of said cylinder to move said main feeler element away from said main anvil.

3. In a thickness checking fixture, a main anvil, a gauge supporting head overhanging said main anvil in fixed relation thereto, a cylinder carried by said head, a piston in said cylinder, supporting means carried by said piston, a dial gauge carried by said supporting means, a zero adjust anvil carried by said head in position to be engaged by the feeler pin of said dial gauge, said supporting means having a main feeler element projecting downwardly from said head in alignment with said main anvil, and means to control the movement of said piston in said cylinder and thereby said supporting means comprising a control valve for fluid pressure to drive said piston in either direction relative to said cylinder, one direction to move said main feeler element into contact with work on said main anvil and the other direction to move said main feeler element away from said main anvil, and a pressure regulating valve for adjusting the pressure of such fluid pressure and thereby the pressure of said main feeler element on the work.

4. A thickness checking fixture comprising a base, an anvil column extending upwardly therefrom, a main anvil carried by the upper end of said anvil column, a gauge column spaced horizontally from said anvil column and extending upwardly from said base, a cylinder carried by said gauge column, a piston therein having gauge supporting means, a dial gauge carried by said supporting means, a zero adjust anvil carried by said gauge column in position to be engaged by the feeler pin of said dial gauge, said supporting means having a main feeler element projecting from said head in alignment with said main anvil, and means for selectively supplying fluid pressure under predetermined pressure to either end of said cylinder to move said piston therein and thereby said main feeler element in either direction relative to said gauge column.

5. A thickness checking fixture comprising a main anvil, a head, means for rigidly supporting said main anvil and said head with respect to each other with the head above the anvil, a cylinder located in said head, a piston in said cylinder and having a piston rod extending therefrom, a main feeler element on the lower end of said piston rod, a dial gauge carried by said piston rod, a zero adjust anvil carried by said head in position to be engaged by the feeler pin of said dial gauge, means to control the movement of said piston in said cylinder comprising a control valve for fluid pressure to either end of said cylinder, and a pressure regulating valve for adjusting such fluid pressure and thereby the pressure of said main feeler element on the work.

6. A thickness checking fixture comprising a main anvil, a head, means for rigidly supporting said main anvil and said head with respect to each other with the head above the anvil, a cylinder located in said head, a piston in said cylinder and having a piston rod extending therefrom, a main feeler element on the lower end of said piston rod, a dial gauge carried by said piston rod, a zero adjust anvil carried by said head in position to be engaged by the feeler pin of said dial gauge, means to control the movement of said piston in said cylinder comprising a control valve for fluid pressure to either end of said cylinder, a pressure regulating valve for adjusting such fluid pressure and thereby the pressure of said main feeler element on the work, flow-control valves between said control valve and the ends of said cylinder, and a check valve shunting each of said flow-control valves and opening toward the cylinder.

References Cited in the file of this patent

UNITED STATES PATENTS

| | | |
|---|---|---|
| 1,662,213 | Steiner | Mar. 13, 1928 |
| 2,554,171 | Brunot et al. | May 22, 1951 |

FOREIGN PATENTS

| | | |
|---|---|---|
| 425,029 | Germany | Feb. 12, 1926 |